United States Patent
Schön et al.

[11] Patent Number: 6,131,030
[45] Date of Patent: Oct. 10, 2000

[54] SYSTEM NETWORK AND METHOD FOR THE TRANSFERENCE OF CELL HANDOVER INFORMATION

[75] Inventors: Erik Schön, Stockholm; Göran Rune, Linköping; Per Willars, Stockholm; Lars Håkan Palm, Lund, all of Sweden

[73] Assignee: Telefonaktiebolaget LM Ericsson, Stockholm, Sweden

[21] Appl. No.: 09/136,696

[22] Filed: Aug. 19, 1998

[51] Int. Cl.[7] .................................................. H04Q 7/20
[52] U.S. Cl. .......................................... 455/438; 455/509
[58] Field of Search .................................. 455/422, 432, 455/436, 439, 440, 438, 450, 509, 560, 561

[56] References Cited

U.S. PATENT DOCUMENTS

| | | | |
|---|---|---|---|
| 5,189,734 | 2/1993 | Bailey et al. | 455/439 |
| 5,276,906 | 1/1994 | Felix | 455/438 |
| 5,432,843 | 7/1995 | Bonta | 455/438 |
| 5,627,831 | 5/1997 | Azmak | 370/332 |
| 5,913,167 | 6/1999 | Bonta et al. | 455/438 |

FOREIGN PATENT DOCUMENTS

| | | |
|---|---|---|
| 0 849 963 A2 | 12/1997 | European Pat. Off. . |
| 0 849 963 A2 | 6/1998 | European Pat. Off. . |

*Primary Examiner*—Nguyen Vo
*Assistant Examiner*—Marsha D. Banks-Harold
*Attorney, Agent, or Firm*—Jenkens & Gilchrist

[57] ABSTRACT

A system network and method improving handovers, particularly for reducing the amount of inter-cellular transfer information stored in base station controllers or radio network controllers, is disclosed. Instead of storing routing information for every possible inter-cellular handover at each control node, signaling network technology is employed to effectuate communication of all relevant inter-cellular handover information between all of the control nodes, thereby coordinating routing information transference across a distributed system.

45 Claims, 2 Drawing Sheets

SYSTEM NETWORK AND METHOD FOR THE TRANSFERENCE OF CELL HANDOVER INFORMATION

BACKGROUND OF THE PRESENT INVENTION

1. Field of the Invention

The present invention relates generally to telecommunications systems and methods, particularly to system networks and methods for improved handovers within telecommunications systems, and, more particularly, to systems and methods for allocating cellular resources using signaling system commands.

2. Background and Objects of the Present Invention

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

As is well understood in the art, mobile phones have a limited range and communicate with respective base stations within cellular radio communication systems. Within such systems, a handover occurs when a mobile phone moves out of range of its existing base station (BS) contact within a given cell, i.e., the radiofrequency (RF) characteristics of the call connection deteriorate below a specified level or the RF characteristics of another BS in another, neighboring cell beneficially increases beyond a specific threshold relative to the current BS. Instead of allowing the call connection signal to deteriorate to noise level, the call connection is transferred or handed-over to another BS (and therefore another cell) to maintain the communication with the roving mobile subscriber. Handovers are also necessary in other situations to handle congestion and geographical problems, the details of which are irrelevant to the subject matter of the present invention.

Elaborate algorithms are utilized in determining whether or not to make a handover. These algorithms utilize measurements performed by the mobile station (MS) and the radio communication system or radio access network (RAN) within which the MS operates. For example, signal strength measurements on the active or operating cell(s) and neighboring cells are performed by the MS, which are known as Mobile Assisted Handover (MAHO), as well as signal strength measurements and quality supervision of the established connection via the active cell(s). Various neighboring cell information is needed for handover: the radio interface identification of the neighboring cells in the radio interface, e.g., by the frequency and code of the broadcast channel and radio-related parameter settings, such as minimum signal strength threshold levels; broadcast channel transmission level(s), etc. It should be understood that although a given identification should uniquely identify a particular cell, the same radio interface identification may be reused in different parts of a network. Such reuse must, of course, be planned so that a mobile station (user equipment) within a specific geographical area can only receive one specific radio interface identification within a given cell.

With reference now to FIG. 1, there is shown a portion of a radio access network, designated by the reference numeral 100, within which a given MS 110 operates. For simplicity, only the one MS 110 will be illustrated. It should, however, be understood that hundreds of discrete MSs would normally be operational within each cell within the RAN 100. The MS 110 is in contact with a BS 115 while roaming within cell 120. Cells 125, 130, 135, 140, 145 and 150 neighbor the active cell 120. With further reference to FIG. 1, the MS 110, currently operating within active cell 120, is moving toward neighboring cell 125 (as indicated by the arrow), the communications within which are controlled by another BS 155. It should be understood that BSs 115 and 155 preferably cover three-sector cells by use of antennas with pointing azimuths of 120 degrees. In other words, BS 115 covers each of cells 120, 140 and 145.

When MS 110 moves out of the range of BS 115, i.e., outside of cell 120, or more within the range of neighboring BS 155, i.e., within cell 125, a handover is initiated from BS 115 to BS 155, which then handles all of the wireless communications for that MS 110 while within communications contact. It should be understood, however, that another handover may shift control back to BS 115 should the MS 110 remain at the signal border between the base stations or geographical or meteorological characteristics come into play. In any event, a soft handover environment is envisioned where the user equipment, e.g., MS 110, communicates with various cells simultaneously, utilizing the macro-diversity characteristics of the soft handover technique, and dynamically establishing (and releasing) radio communication branches to support a continuous connection to the MS 110.

Inter-cell handovers are relatively straightforward when between cells under common control of a Radio Network Controller (RNC), which coordinates coverage over a group of cells.

Communications across discrete RNC coverage areas or between different Public Land Mobile Networks (PLMN), however, are more complicated, and much more identification information is required to effectuate cell-to-cell handovers across such boundaries. Not only cell identities but RNC and other controller information is required to effectively make such call transfers. For example, in an inter-RNC transfer, discussed in more detail in the Detailed Description portion of this specification, the signaling network address of the new RNC, along with relevant cell and neighboring cell data, is stored within the originating RNC to effectuate such handovers in conventional systems. The reason for the permanent storage of such elaborate routing information is to be prepared for all possible handovers.

There are, of course, problems associated with the storage of such detailed routing information. The first is size. Maintaining an elaborate list or database of all possible cellular transfer contingencies requires not only space but complicated updating procedures to keep the information within each RNC node updated with the most recent and correct cell information and RNC signaling network addresses throughout the entire system.

It is, therefore, an object of the present invention to simplify the mechanism for cell-to-cell transfers, particularly in the more complicated scenario of inter-RNC transfers.

It is also an object of the present invention to ameliorate or eliminate the complicated updating procedures needed in conventional systems.

It is a further object of the present invention to reduce the amount of information required to be stored within a given RNC in order to effectuate cell transfers.

SUMMARY OF THE INVENTION

The system network and method of the present invention is directed to improvements in handovers, particularly to the reduction in the amount of inter-cellular transfer information stored in base station controllers or radio network controllers. Instead of storing routing information for every possible inter-cellular handover at each control node, signaling network technology is employed to effectuate communication of all relevant inter-cellular handover information between all of the control nodes, thereby coordinating routing information transference across a distributed system.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
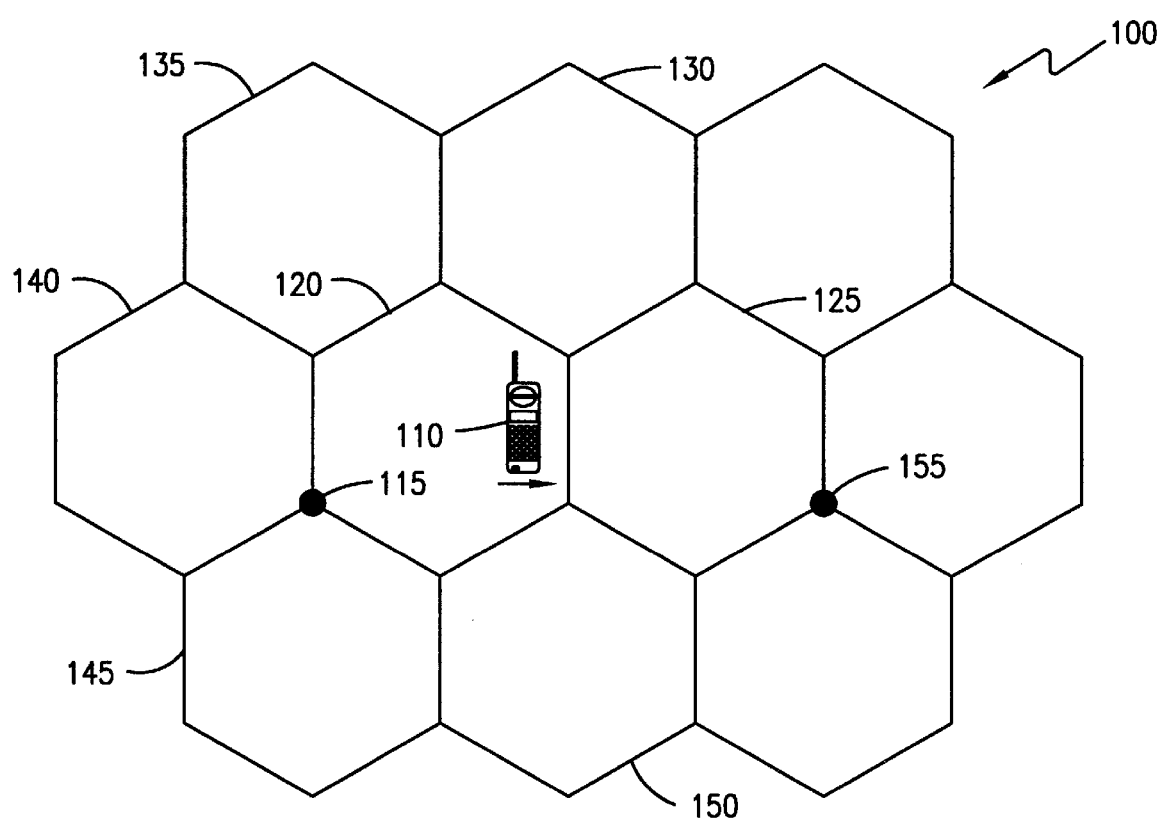
FIG. 1 is an illustration of a portion of a radio access network in which the principles of the system network and method of the present invention may be employed.
Figure 2:
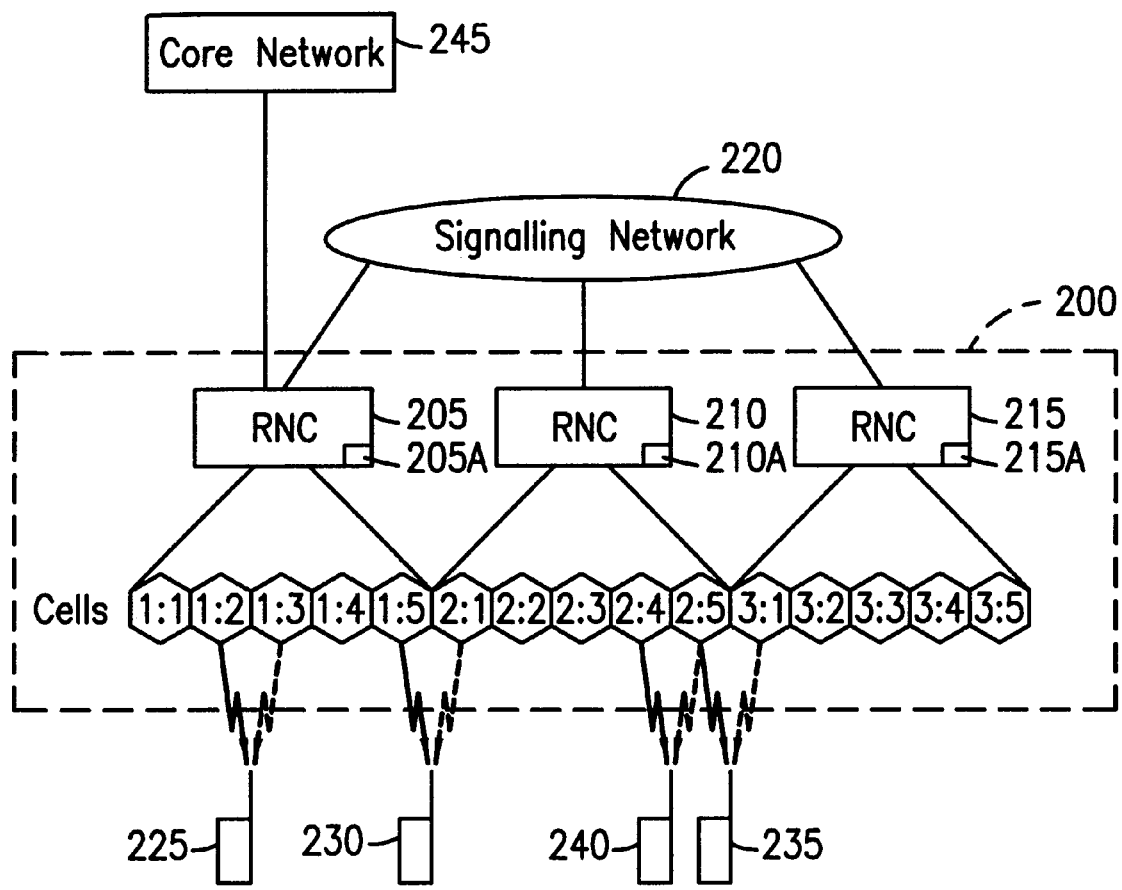
FIG. 2 is an illustration of the architecture of a mobile communication network such as the radio access network of FIG. 1.

With reference now to FIG. 2, there is illustrated an architecture of a mobile communications network such as a Radio Access Network 200 (RAN), a portion of which is shown in FIG. 1. A number of cells, such as shown in hexagonal form in FIG. 1, are illustrated in FIG. 2 aligned for exemplary purposes along a row. A first RNC 205 controls the first five cells in the row, i.e., cells 1:1, 1:2, 1:3, 1:4 and 1:5. A second RNC 210 controls the next five, i.e., cells 2:1, 2:2, 2:3, 2:4 and 2:5, and a third RNC 215 controls the remaining cells, i.e., cells 3:1, 3:2, 3:3, 3:4 and 3:5. Interconnecting the RNCs is a signaling network 220, e.g., Signaling System No. 7 (SS7), to enable RNC-RNC signaling in accordance with the present invention. Finally, mobile stations 225, 230, 235 and 240 are shown which represent any user equipment by which a subscriber may access services offered by the operator's Core Network 245.

Prior to the discussion of the advantages of the present invention over conventional systems and methods, some background descriptive information is needed to define some terms and technological roles. For example, a given RNC may act as a Serving RNC or a Drift RNC. As its name suggests, a Serving RNC is in charge of the connection with a particular mobile station, i.e., the Serving RNC has full control of this connection inside the RAN. Also, the Serving RNC is connected directly to the Core Network 245 so that the subscribers in contact with their Serving RNC may access the services offered therein. A Drift RNC, as its name suggests, supports the Serving RNC with radio resources for a mobile station connection in cells controlled by the Drift RNC and remote from the Serving RNC.

The RAN 200 determines the role of a given RNC, i.e., Serving or Drift, when the Mobile Station-Core Network (MS-CN) connection is being established. Typically, the RNC that controls the cell where the initial MS-CN connection is established is assigned the Serving RNC role for that connection. As the mobile station moves, the connection is maintained by establishing radio communication branches via new cells, possibly also involving cells controlled by other RNCs, i.e., Drift RNCs. With reference again to FIG. 2, RNC 205 acts as the Serving RNC for the connections with each of MSs 225, 230, 235 and 240, where the connection to MS 235 is after several handovers now communicated via a cell controlled by RNC 210, acting as a Drift RNC for this connection. It should be understood that although RNC 205 only has a connection to the Core Network 245 in FIG. 2, RNCs 210 and 215 may also have such connections, particularly for those MSs to which those RNCs act as Serving RNCs.

With reference again to the RAN architecture of FIG. 2, the simpler inter-cell transfer within the same RNC will now be discussed. As shown in the figure, MS 225 is in contact with the RAN 200 via cell 1:2, which has cells 1:1 and 1:3 as neighbors. Due to changed radio conditions, the handover decision algorithm has determined that a radio communication branch for MS 225 is now to be established via neighboring cell 1:3. Since both cells 1:2 and 1:3 are controlled by the same RNC, i.e., RNC 205, the allocation of radio resources in cell 1:3 is performed within the RNC 205. As is apparent, no inter-RNC signaling is required in this example. Further, since the cells that neighbor the new, handover cell 1:3, i.e., cells 1:2 and 1:4, are also controlled by RNC 205, no information regarding neighboring cells covered by other RNCs is needed either. Upon the establishment of a connection between MS 225 and the RAN 200 through cell 1:3, evaluation of potential subsequent handovers to cell 1:4 or back to cell 1:2 commences, as is understood in the handover art.

For an inter-RNC handover, MS 230, which is in contact with RAN 200 via cell 1:5 of RNC 205, has cells 1:4 and 2:1 as neighboring cells. Due to changing radio conditions, the handover decision algorithm in this example determines that a radio communication branch is to now be established via cell 2:1, which is controlled by neighboring RNC 210 of the RAN 200. Accordingly, the actual allocation of radio resources for the MS 230 within cell 2:1 is performed within the RNC 210. Pursuant to the improvements of the system network and method of the present invention, however, the Serving RNC 205 uses the signaling network 220 to request allocation and preparation of the radio resources in cell 2:1, the cell identifiers for which are stored within the RNC 205, i.e., the neighboring or "ncell" identities (cells 1:5 and 2:2), ncell data (e.g., transmit power levels), and routing information (RNC signaling addresses) for how to reach each RNC of the ncells.

Figure 3:
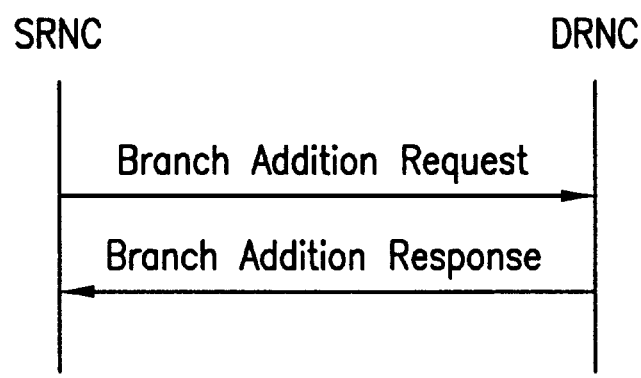
FIG. 3 is an example of a branch addition request and response regarding resource allocations within the radio access network shown in FIGS. 1 and 2 and pursuant to the present invention.

With reference now to FIG. 3, there is illustrated an RNC-RNC signaling procedure for the request of establishment of radio communications via a new branch. In particular, a Serving RNC, such as RNC 205 for MS 230, forwards a Branch Addition Request to the pertinent Drift RNC (DRNC), i.e., RNC 210 in FIG. 2, across the signaling network 220. A positive Branch Addition Response to the request, again across the signaling network 220, contains the identification of allocated radio resources in cell 2:1, as well as the identities of the neighboring cells of cell 2:1, i.e., cells 1:5 and 2:2. According to the preferred embodiments of the present invention, the cell and neighboring cell data for cell 2:1 is stored, on a substantially permanent basis, within the RNC 210, and only those RNCs that are direct neighbors to RNC 210, i.e., both of adjacent RNCs 205 and 215 in this example. In conventional systems, however, the signaling network address of RNC 210, along with a copy of all the relevant cell and neighboring cell data for cell 2:1, is stored not only within the Serving RNC 205 and RNC 215, but also all other RNCs of RAN 200 on a permanent basis.

With further reference to FIG. 2, MS 235 is in contact with RAN 200 via cell 2:5, which has cells 2:4 and 3:1 as neighbor cells. Due to changed radio conditions here, the handover decision algorithm determines that a radio connection is to be taken over by cell 3:1, which, of course, is controlled by RNC 215, and an inter-drift handover is initiated. Accordingly, the allocation of radio resources in cell 3:1 is performed by RNC 215. Unlike RNC 210, it should be noted that the cells within RNC 215 are not adjacent to any of the cells in Serving RNC 205. As in the prior example, Serving RNC 205 uses the signaling network 220, e.g., SS7 commands, to request allocation and preparation of radio resources in cell 3:1, as illustrated and described hereinbefore in connection with FIG. 3. The positive response to this branch additional request also contains the identification of allocated radio resources within cell 3:1 and the identities of those cells neighboring cell 3:1, i.e., cells 2:5 and 3:2. The cell and neighboring cell data for cell 3:1 is permanently stored within RNC 215. As noted above, in traditional systems the signaling network address of RNC 215 and a copy of the pertinent cell and neighboring cell data is also stored, on a permanent basis, within the Serving RNC 205 (and all other RNCs), even though none of the cells controlled by RNC 205 are adjacent a cell of RNC 215.

To recap, a traditional solution for intra- and inter-RNC handovers, particularly within the applicable parts of the GSM standard, is to permanently store all possible handover scenarios within each RNC within the RAN 200, including both the signaling network addresses of all of the RNCs and neighboring cell information of each cell to which a handover is possible within all of the RAN 200. Although the IS-634 standard contains a mechanism for the transfer of the identities of neighboring cells within signaling messages between radio access network nodes, the system network and method of the present invention provides a more elegant solution to the RNC handover information problem, described in more detail below.

As mentioned, instead of having each RNC exhaustively list every handover contingency within its own node, the system network and method of the present invention exploits the signaling capabilities of SS7 (or other signaling protocols) to provide the requisite intercommunication necessary to effectuate the great reduction in size of handover information stored within each node. In other words and with reference again to FIG. 2, RNC 205 stores only the signaling network address of adjacent RNC 210 since cells 1:5 and 2:1 are adjacent. RNC 205 does not store, as in conventional systems, the signaling network address and cell information pertaining to RNC 215 or other non-adjacent RNCs. RNC 210, however, being adjacent both RNCs 205 and 215 (more particularly, cell 2:1 is adjacent cell 1:5 and cell 2:5 is adjacent cell 3:1) contains the signaling network address of both. Similar to RNC 205, RNC 215 stores only the signaling network address of adjacent RNC 210. Even though direct handovers are possible only to adjacent or neighboring cells, conventional RNCs store information pertaining to all handovers within all of the RAN 200 instead of only those local handover possibilities germane to that particular RNC, as set forth in the presently claimed invention.

In order to support subsequent handovers to cells controlled by other RNCs, RNC signaling network addresses and associated neighboring cell information is transferred in signaling messages between the RNCs across the Signaling Network 220 when needed. One appropriate event which may trigger the information transfer is the signaling procedure utilized by a Serving RNC to request radio resources in a Drift RNC when handover to a cell controlled by the Drift RNC is needed, such as illustrated and described in connection with FIG. 3. In the Drift RNC response, the neighboring cell information, including the RNC signaling network addresses of the neighboring cells, of the target cell is included.

With reference again to FIG. 2, MS 240 is roaming within cell 2:4 of RNC 210. When a new radio communication branch via cell 2:5 is established, due to the aforementioned change in rf conditions, the Serving RNC for MS 240, i.e., RNC 205 as for all of the MSs in this example, requests radio resources controlled by RNC 210 for cell 2:5, using the signaling procedure described in connection with FIG. 3. If the request is granted, the response from RNC 210 to RNC 205 also includes the neighboring cell information of cell 2:5, i.e., the information related to cells 2:4 and 3:1. Since cell 3:1 is controlled by another RNC, i.e., RNC 215, the signaling network address of RNC 215 is also included in the response signal, which is stored, on a temporary as needed basis, within RNC 205. Subsequent handovers within the purview of RNC 210, i.e., to cell 2:4, and RNC 215, i.e., to cell 3:1 are thereby facilitated without recourse to permanently storing and maintaining every handover contingency.

It should, therefore, be understood that each RNC pursuant to the system network and method of the present invention can reduce the amount of "permanent" addressing information stored therein by restricting the criteria for such storage to only those RNCs and cells to which it is possible to reach directly via a handover from an own cell, i.e., a given RNC needs to store on a permanent basis information only of its own cells and those cells controlled by another RNC adjacent (directly neighboring) the given RNC. Similarly for RNC addresses. In this manner, less operating and maintenance support is needed to keep each RNC node updated with the most current and correct neighboring cell information and RNC signaling network addresses. Further, handovers between cells can be supported and controlled by any RNC, acting as a Serving RNC, in large radio access networks, such as RAN 200.

It should be understood that the respective radio network controllers have memories, i.e., memories 205A, 210A and 215A, associated therewith. Each memory preferably has a "permanent" portion for storing only the adjacent cell and radio network controller information, i.e., RNC memory 205A contains information not only on its own cells 1:1 to 1:5 but also the cells of RNC 210 adjacent RNC 205 (i.e., cell 2:1), as well as the RNC address of RNC 210. Similarly, RNC memory 210A not only contains information on its own cells, but also the cells of RNCs 205 and 215 adjacent RNC 210 (i.e., cells 1:5 and 3:1), as well as the RNC addresses of RNCs 205 and 215. The permanent portion of memory 205A, however, does not contain identifiers for the cells of radio network controller 215 or the RNC 215 itself, which is non-adjacent RNC 205. Similarly, memory 215A contains information on the cells of RNC 210 adjacent RNC 215 (i.e., cell 2:5), as well as the RNC address of RNC 210, but not that of RNC 205.

A "control" portion of memory 205A contains the temporary, variable information associated with mobile station control, i.e., RNC 205 acting as a serving RNC for the mobile station tracks the progress of the mobile station for resource allocation purposes and receives updates of the mobile's position within the RAN 200. This neighbor cell information is temporarily stored within the RNC 205 and used in the handover triggering algorithms described hereinbefore. The RNC 205 may, for example, transfer radio interface identification information of the neighboring cells to the respective mobile station, e.g., via the signaling network 220 and the appropriate RNC coordinating the radio resource contact with the mobile station, to indicate cells that the mobile station should particularly search for. These updates, e.g., obtained by the aforedescribed Branch Addition Requests and Responses, notify the serving RNC 205 of the identifiers of the cells and radio network controllers associated with the mobile station. In this manner, the serving RNC 205 requisitions radio resources, via signaling across the signaling network 220 to the pertinent RNC (and cells), in the handover cell.

It should be understood that the principles of the system network and method of the present invention are particularly applicable to be utilized within Code Division Multiple Access (CMA) or Wideband CMA (WCDMA) radio access technology, which normally use macro-diversity combinations, i.e., the MS connection can be supported by more than one cell simultaneously. MS mobility is in such systems handled by soft handover, meaning that cells are continuously, as the MS moves about the radio network, added and deleted from the set of cells that are simultaneously supporting the connection, i.e., the active cells.

The teachings of the present invention find particular benefit in large CMA and WCDMA radio access networks where, as discussed hereinbefore, the connection to the MS, via several successive handovers, is supported by cells controlled by RNCs not adjacent to the RNC acting as serving radio network controller.

It should further be understood that the present invention, as in traditional systems, employs various handover algorithms to implement handover capability. Numerous parameters are utilized by the aforedescribed handover decision algorithms, e.g., the transmission power levels of neighboring base transceiver stations and other such "ncell" information. The parameters utilized by the network and method of the present invention, however, include the aforementioned RNC signaling addresses and associated cells, remote or otherwise, thereby enabling the networks and methods of the present invention to employ the improvements set forth herein.

Although preferred embodiments of the system network and method of the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. A radio access network having a multiplicity of cells and a mobile station in communication with said radio access network through a given one of said cells, said radio access network comprising:

a serving radio network controller controlling a plurality of cells within said radio access network and controlling said mobile station;

a plurality of drift radio network controllers each controlling respective other pluralities of said cells; and signaling connection means connecting said serving and drift radio network controllers and providing signaling connections therebetween;

a serving controller memory attached to said serving radio network controller, said memory having a permanent portion and a control portion, said permanent portion comprising a plurality of identifiers of cells and signaling addresses for radio network controllers adjacent said serving radio network controller, said control portion containing signaling addresses of cells adjacent said given cell and identifiers of other radio network controllers adjacent the radio network controller of said given cell, and wherein the permanent portion of said serving controller memory contains no identifiers of a plurality of remote cells and no signaling addresses for remote radio network controllers, said remote radio network controllers being non-adjacent said serving radio network controller, whereby via said signaling connection means said serving controller controls radio resource allocation for handovers of said mobile station to another cell within said radio access network.

2. The radio access network of claim 1, wherein said given and another cells are under the control of said serving radio network controller, said serving radio network controller allocating radio resources therein for said handover.

3. The radio access network of claim 2, wherein said another cell is adjacent a first remote cell of a first drift radio network controller, said serving radio network controller having a serving controller memory containing identifiers for said first remote cell and a signaling address for said first drift radio network controller therein.

4. The radio access network of claim 1, wherein said given cell is under the control of said serving radio network controller and said another cell is under the control of a first drift radio network controller, said given and another cells and said serving and said first drift radio network controllers being adjacent, respectively, said serving radio network controller having a serving controller memory containing identifiers for said another cell and a second remote cell and a signaling address for said first drift radio network controller, said serving radio network controller controlling said handover to said another cell by allocating said radio resources within said first drift radio network controller using said signaling connection means.

5. The radio access network of claim 4, wherein said given and said another cells are under the control of said first drift radio network controller.

6. The radio access network of claim 1, wherein said given cell is under the control of a first drift radio network controller and said another cell is under the control of a second drift radio network controller, said first and second drift radio network controllers being non-adjacent said serving radio network controller and containing remote identifiers therein for respective cells adjacent said given and other cells, said serving radio network controller having a serving controller memory containing identifiers for respective other cells and signaling addresses for respective other radio network controllers adjacent said serving radio network controller, said serving controller memory containing none of said remote identifiers.

7. The radio access network of claim 6, wherein said serving radio network controller receives a plurality of said remote identifiers for the respective cells adjacent said given and another cells from said first drift radio network controller across said signaling connection means and controls said handover to said another cell by allocating radio resources within said second drift radio network controller using said signaling connection means.

8. The radio access network of claim 1, wherein each of the plurality of drift radio network controllers include a respective drift controller memory associated therewith, each of said memories having a permanent portion each substantially consisting of a plurality of respective identifiers of adjacent cells and signaling addresses for radio network controllers and no identifiers of non-adjacent cells and no signaling addresses for remote radio network controllers.

9. The radio access network of claim 1, wherein said control portion of said serving controller memory contains a plurality of identifiers of adjacent cells and signaling addresses for radio network controllers for said mobile station in said given cell.

10. The radio access network of claim 9, wherein, upon handover of said mobile station to said another cell, another plurality of identifiers of cells and signaling addresses for radio network controllers adjacent said another cell are stored within said control portion of said serving controller memory.

11. The radio access network of claim 1, wherein said signaling connection means comprises a Signaling System 7 (SS7) compatible system employing SS7 protocols.

12. The radio access network of claim 1, wherein said radio access network is macro-diversity compatible, said mobile station being in communication with said radio access network through a plurality of active cells.

13. The radio access network of claim 12, wherein said radio access network is a Code Division Multiple Access System.

14. The radio access network of claim 13, wherein said radio access network is a Wideband Code Division Multiple Access System.

15. The radio access network according to claim 1, wherein said serving radio network controller forwards a resource allocation request for handover of said mobile station to said another cell.

16. The radio access network according to claim 15, wherein a given one of said plurality of drift radio network controllers responds to said resource allocation request of said serving radio network controller.

17. The radio access network according to claim 16, wherein said given one of said drift radio network controllers forwards neighboring cell information to said serving radio network controller.

18. The radio access network according to claim 17, wherein said neighboring cell information passes through at least one additional drift radio network controller to said serving radio network controller, at least one of said additional drift radio network controllers saving said neighboring cell information therein.

19. The radio access network according to claim 17, wherein said neighboring cell information comprises at least one cell identifier associated with said another cell.

20. The radio access network according to claim 17, wherein said neighboring cell information comprises at least one signaling address associated with said another cell.

21. In a radio access network having a multiplicity of cells and a mobile station in communication with said radio access network through a given one of said cells, a method for handover of said mobile station to another of said cells, said method comprising the steps of:

transmitting, by a serving radio network controller for said mobile station, a resource allocation request for handover of said mobile station to said another cell, said resource allocation request being sent across a signaling connection means interconnecting said serving and a plurality of other radio network controllers;

allocating resources within said another cell associated with said handover;

handing over said mobile station to said another cell;

updating a serving controller memory, associated with said serving radio network controller, with cell identifiers and radio network controller signaling addresses associated with and neighboring said another cell, wherein said serving controller memory has a permanent portion comprising a plurality of identifiers of adjacent cells and signaling addresses for radio network controllers and no identifiers of remote cells and no signaling addresses for remote radio network controllers, said remote radio network controllers and remote cells associated therewith being non-adjacent said serving radio network controller.

22. The method according to claim 21, further comprising, after said step of transmitting, the step of:

responding, by a drift radio network controller controlling said another cell, to said resource allocation request of said serving radio network controller, said response being sent across said signaling connection means to said serving radio network controller.

23. The method according to claim 22, wherein in said step of responding, said drift radio network controller for said another cell forwards neighboring cell information to said serving radio network controller.

24. The method according to claim 23, wherein said neighboring cell information passes through at least one additional drift radio network controller to said serving radio network controller, at least one of said additional drift radio network controllers saving said neighboring cell information therein.

25. The method according to claim 23, wherein said neighboring cell information comprises at least one cell identifier associated with said another cell.

26. The method according to claim 23, wherein said neighboring cell information comprises at least one signaling address associated with said another cell.

27. The method according to claim 21, wherein said serving controller memory has a permanent portion and a control portion, wherein, prior to said handover, said control portion contains signaling addresses for cells adjacent said given cell and signaling addresses for radio network controllers adjacent the radio network controller of said given cell, and wherein, after updating, said control portion contains identifiers of cells adjacent said another cell and identifiers of radio network controllers adjacent the radio network controller of said another cell.

28. The method according to claim 21, wherein said resource allocation request across said signaling connection means is compatible with Signaling System 7 protocols.

29. The method according to claim 21, wherein said radio access network is macro-diversity compatible, said mobile station being in communication with said radio access network through a plurality of active cells.

30. The method according to claim 29, wherein said radio access network is a Code Division Multiple Access System.

31. The method according to claim 30, wherein said radio access network is a Wideband Code Division Multiple Access System.

32. A serving radio network controller for a mobile station in a given cell of radio access network, said serving radio network controller comprising:

a serving controller memory having a permanent portion therein, said permanent portion containing a plurality of identifiers of cells and radio network controllers adjacent said serving radio network controller and cells therein, said permanent portion containing no identifiers of a plurality of remote cells and no signaling addresses for remote radio network controllers of said radio access network, said remote radio network controllers and respective remote cells associated therewith being non-adjacent said serving radio network controller.

33. The serving radio network controller according to claim 32, wherein said serving controller memory further comprises a control portion containing signaling addresses for cells adjacent said given cell and identifiers of other radio network controllers adjacent the radio network controller of said given cell.

34. The serving radio network controller according to claim 32, wherein said serving radio network controller communicates with adjacent and remote other radio network controllers via a signaling connection means interconnecting said controllers and providing signaling connections therebetween.

35. The serving radio network controller according to claim 34, wherein said serving radio network controller coordinates a handover of said mobile station from said given cell to another cell utilizing said signaling connection means.

36. The serving radio network controller according to claim 34, wherein said signaling connection means comprises a Signaling System 7 (SS7) compatible system employing SS7 protocols.

37. The serving radio network controller according to claim 32, wherein said radio access network is macro-diversity compatible, said mobile station being in communication with said radio access network through a plurality of active cells.

38. The serving radio network controller according to claim 37, wherein said radio access network is a Code Division Multiple Access System.

39. The serving radio network controller according to claim 38, wherein said radio access network is a Wideband Code Division Multiple Access System.

40. The serving radio network controller according to claim 32, wherein said serving radio network controller forwards a resource allocation request for handover of said mobile station to another cell.

41. The serving radio network controller according to claim 40, wherein a given one of said radio network controllers responds to said resource allocation request of said serving radio network controller.

42. The serving radio network controller according to claim 41, wherein said given one of said radio network controllers forwards neighboring cell information to said serving radio network controller.

43. The serving radio network controller according to claim 42, wherein said neighboring cell information passes through at least one additional radio network controller to said serving radio network controller, at least one of said additional radio network controllers saving said neighboring cell information therein.

44. The serving radio network controller according to claim 42, wherein said neighboring cell information comprises at least one cell identifier associated with said another cell.

45. The serving radio network controller according to claim 42, wherein said neighboring cell information comprises at least one signaling address associated with said another cell.

* * * * *